United States Patent
Xiong

(10) Patent No.: US 6,456,956 B1
(45) Date of Patent: Sep. 24, 2002

(54) ALGORITHM FOR SELECTIVELY SUPPRESSING NLOS SIGNALS IN LOCATION ESTIMATION

(75) Inventor: Li Xiong, Waltham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/393,050

(22) Filed: Sep. 9, 1999

(51) Int. Cl.[7] ................................................ G01C 3/22
(52) U.S. Cl. ......................... 702/115; 702/94; 702/95; 702/149; 702/150
(58) Field of Search ............................. 702/85–87, 92, 702/94, 95, 33, 150–151

(56) References Cited

U.S. PATENT DOCUMENTS 6,064,942 A * 5/2000 Johnson et al. ............. 701/213
6,266,014 B1 * 7/2001 Fattouche et al. .......... 342/450
6,278,404 B1 * 8/2001 Niles ........................... 342/359

OTHER PUBLICATIONS

Merriam–Webster, Merriam–Webster's Collegiate Dictionary (10th ed.), pp. 622 and 975 (1993).*

Ralph O. Schmidt, *Multiple Emitter Location and Signal Parameter Estimation*, 34 IEEE Transactions on Antennas and Propagation, 276 (1986).

Kevin J. Krizman et al., *Wireless Position Location: Fundamentals, Implementation Strategies, and Sources of Error*, IEEE 47th Vehicular Technology Conference Proceedings, 919 (1997).

R. G. Stansfield, *Statistical Theory of D.F. Fixing*, 94 The Journal of the Institution of Electrical Engineers, 762 (1947).

Marilynn P. Wylie et al., *The Non–Line of Sight Problem in Mobile Location Estimation*, IEEE 5th International Conference on Universal Personal Communication, 827 (1996).

Marko Silventoinen et al., *Mobile Station Locating in GSM*, IEEE Wireless Communication System Symposium, 53 (1995).

Hamid Krim et al., *Two Decades of Array Signal Processing Research*, 13 IEEE Signal Processing, 67(1996).

* cited by examiner

Primary Examiner—Marc S. Hoff
Assistant Examiner—Sam H. Choi
(74) Attorney, Agent, or Firm—Leonard Charles Suchyta; James K. Weixel

(57) ABSTRACT

A method of estimating the position of a transmitter using angle-of-arrival values determined at each of a plurality of base stations. The method includes calculating a position estimation using the angle-of-arrival values from all of the base stations, calculating an error at each of the base station, and removing those base stations whose error exceeds a threshold from the calculation.

2 Claims, 6 Drawing Sheets

ALGORITHM FOR SELECTIVELY SUPPRESSING NLOS SIGNALS IN LOCATION ESTIMATION

BACKGROUND OF THE INVENTION

A. Field of the Invention

The present invention relates to determining the location of a moving radio transmitter using fixed passive radio receivers.

B. Description of the Prior Art

Accurate methods for determining the position of a wireless transmitter have long been sought. Wireless positioning systems in the past were primarily used for military, public safety and marine science research. Recently, commercial services have proposed useful applications for positioning technologies in such areas as accident reporting, mobile yellow pages, carrier zone billing and fleet management.

An exemplary use of wireless position is the FCC's mandate that by Oct. 1, 2001, all wireless carriers provide the longitudinal and latitude coordinates of any wireless E911 caller. The goal of this mandate is to provide the location of the caller to within a root means square (RMS) distance of 125 meters.

As discussed in "A Selective Model to Suppress NLOS Signals in Angle-of-Arrival (AOA) Location Estimation", by Xiong (IEEE, Sep. 9, 1998), which is hereby expressly incorporated herein by reference, one proposed method for location estimation is called Angle of Arrival, also known as directional finding. The position of a transmitter is estimated based on the angles of incoming signals detected at fixed base stations. In order to determine the latitude and longitude of a transmitter via triangulation, it is necessary to use at least two base stations. In order to determine a position in three dimensions (latitude, longitude and height), at least a third base station is required.

In "Two Decades of Array Signal Processing Research" by Krim et al. (IEEE Signal Processing, July 1996, Vol. 13, No. 4), which is hereby expressly incorporated herein by reference, the authors discuss various methods for determining the propagation direction from a transmitter to an array receiver. A first method disclosed involved "steering" the array in one direction at a time and measuring the received power. The locations of maximum power reception provide the angle of arrival estimate.

FIG. 1 shows graphically how AOA is performed using two base stations. Base stations 100 and 110 each receive a signal from radio transmitter 120. Base station 100 determines the angle $\theta_1$ to transmitter 120 and base station 110 determines the angle $\theta_2$ to transmitter 120. Each angle is used to create a line of bearing (LOB) in the direction of the user. The position at which the LOBs intersect is an estimation of the position of transmitter 120.

A number of error sources control the accuracy of AOA location estimation. These error sources include: a bias in antenna placement; background noise in the angular measurement due to multipath signals; and lack of a direct path between the transmitter and the receiver, called non line-of-sight (NLOS) measurements. Non-line-of-sight signals may include errors from reflection and diffraction, such that the measured direction is different from the location of the signal source.

Antenna placement bias can be mitigated with the periodical calibration and maintenance of the antenna system. A number of high-resolution algorithms have been proposed to counter the effects of background noise in the angular measurement. The inventor of this application has suggested viable method has been proposed to counter the effects of NLOS in AOA measurements.

SUMMARY OF THE INVENTION

The objects of the invention are to mitigate the effects of NLOS on angle of arrival measurements for location estimation.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention includes a method of estimating the position of a transmitter using a direction estimation from each of a plurality of receivers including steps of calculating a first position estimation using each of the direction estimations, calculating an error in the direction estimation for each receiver, selecting those receivers whose measurement error is below a threshold, and calculating a second position estimation using the direction estimations of the selected receivers.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

As a first step in explaining the AOA location estimation method of the present invention, it is necessary to present a definition of variables. There are N base stations (receiving stations) at known positions $(X_i, Y_i)$ in the X,Y plane, where i identifies one of the N base stations (i=1 . . . N). When the i-th base station receives a signal, an estimation of the angle from the i-th base station to the transmitter, $\theta_1$, is made.

Figure 1:
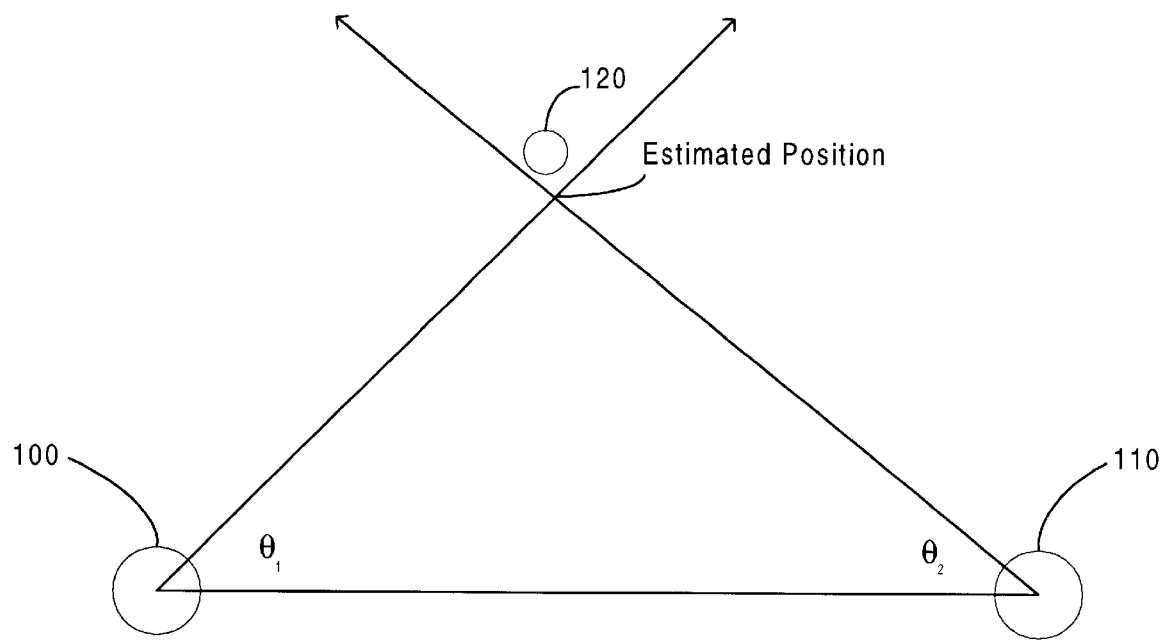
FIG. 1 is a graphical representation of position estimation using angle-of-arrival.
Figure 2:
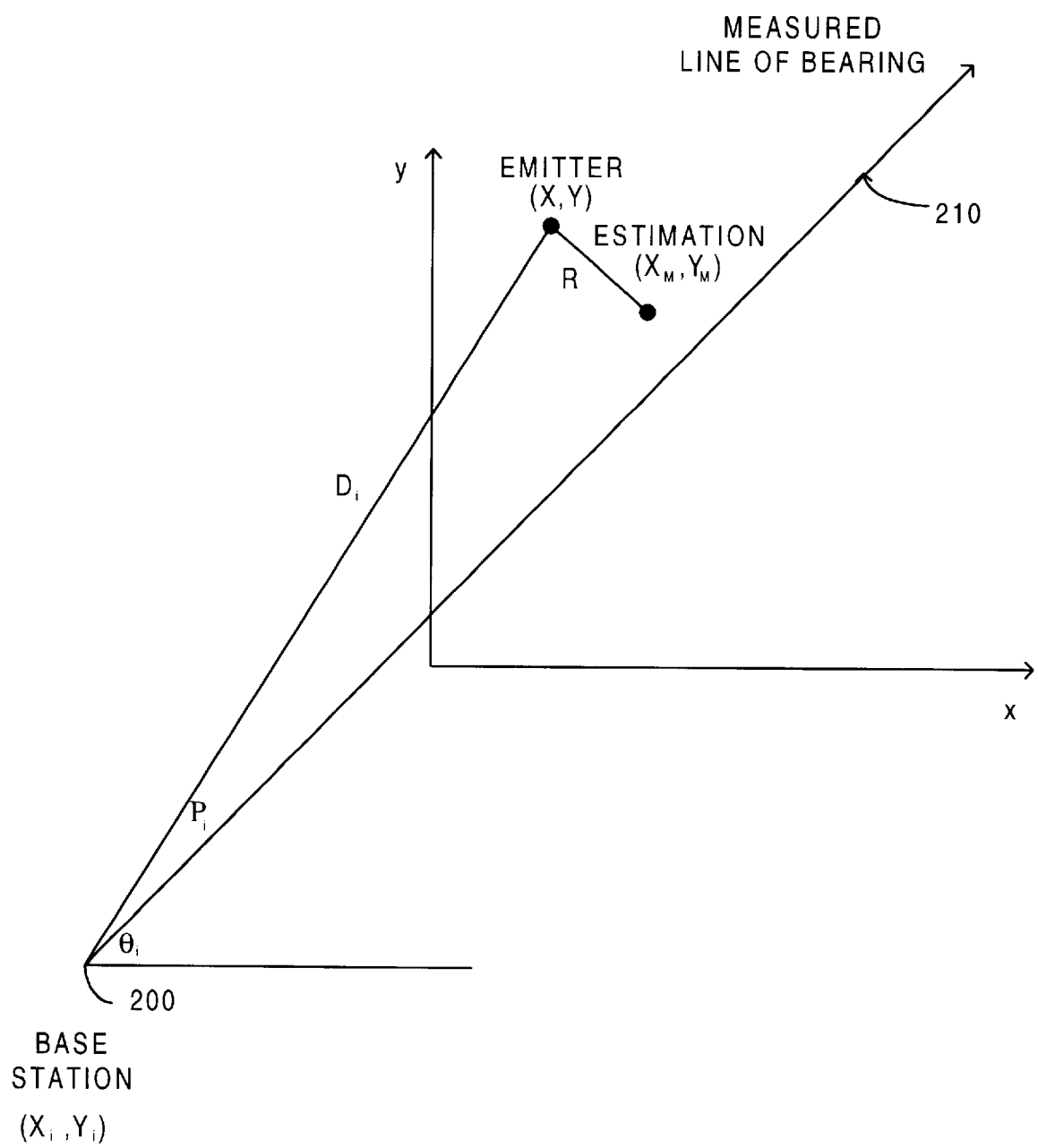
FIG. 2 is graphical representation of the relationship between the position of an emitter and an estimation of the position of the emitter.

As shown in FIG. 2, a line of bearing 210 is drawn from each of the receiving base stations 200 in the direction $\theta_i$. Each angle $\theta_i$, however, will include a certain error in the angular measurement expressed as $\psi_i$.

Figure 3:
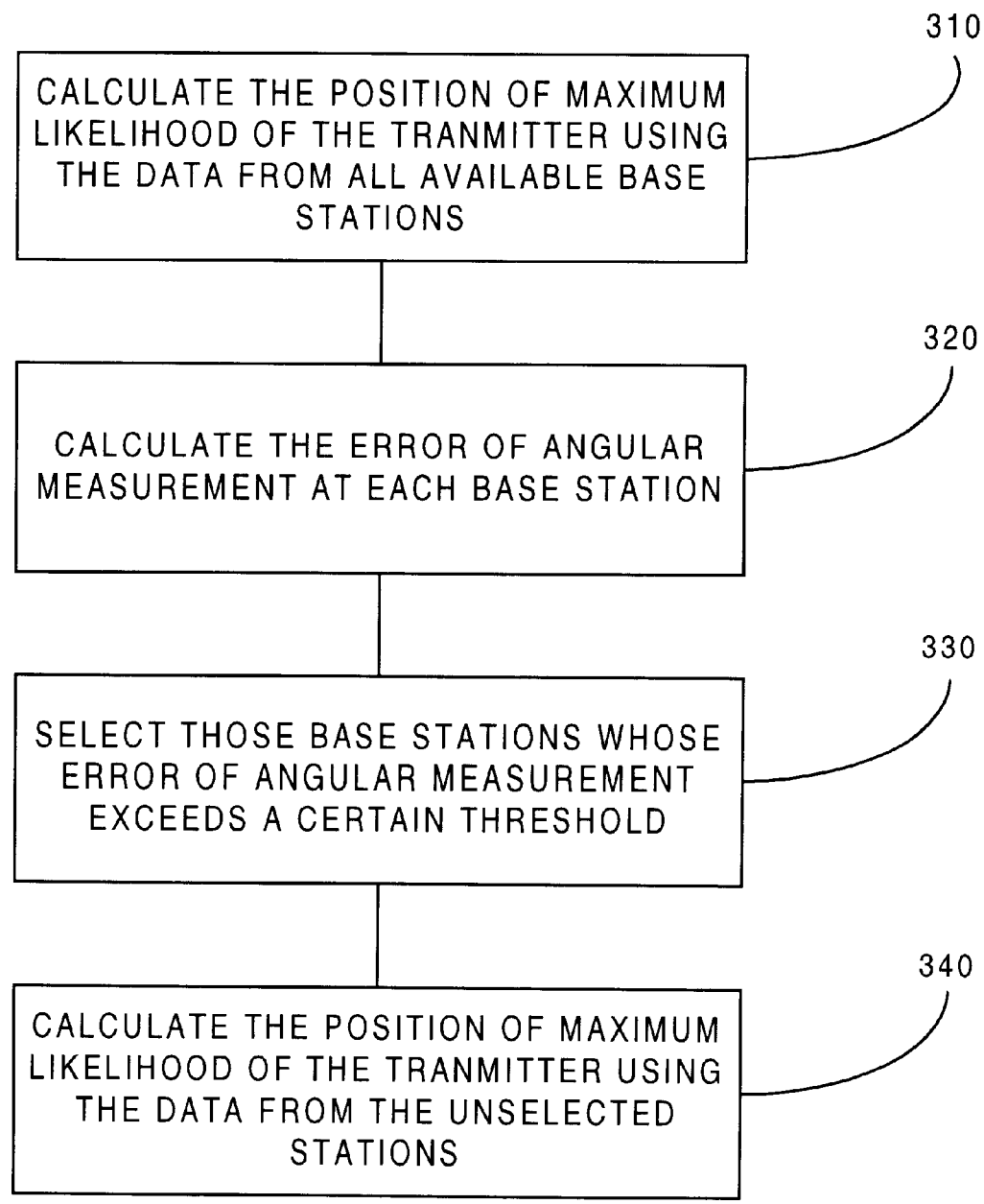
FIG. 3 is a flow chart of exemplary steps in a method of estimation the position of an transmitter.

FIG. 3 shows exemplary steps in a process for determining an estimated position of a transmitter. The first step in the process is performing a calculation of the position of maximum likelihood of the transmitter using data from all of the available base stations (step 310). In order to decrease the complexity of the calculation, certain assumptions can be used. A first assumption is that the bias in the angular measurement is negligible. A second assumption is that the angular measurement error can be adequately described by a Gaussian distribution. Using these two assumptions, the probability of finding the true line of bearing inside $\theta_i + \psi_i + d\psi_i$ can be expressed as:

$$P(\psi_1 \ldots \psi_N) d\psi_1 \ldots d\psi_N = \quad \text{(Equation 1)}$$

$$\frac{1}{(2\pi)^{N/2} \sigma_1 \ldots \sigma_N} \exp\left(-\frac{1}{2} \sum_{i=1}^{N} \frac{\psi_i^2}{\sigma_i^2}\right) d\psi_1 \ldots d\psi_N$$

The value $\sigma_i$ in the above equation is the standard deviation of the angular error in the measurement at the i-th base station. The standard deviation is usually considered quite small for the purpose of such measurements. Using a third assumption, that the standard deviation is small enough that the region uncertainty of the mobile position is small compared to the range from the mobile to the base station, the angular error may be calculated using the following equation:

$$\psi_i = \frac{|(X - X_i)\sin\theta_i - (Y - Y_i)\cos\theta_i|}{D_i} \quad \text{(Equation 2)}$$

In the above $D_i$ is the range from the i-th base station to the RF Source.

The position having the maximum likelihood of corresponding to the position of the mobile phone can be calculated by maximizing the above joint distribution of Equation 2, or by minimizing the sum of the squares of the exponential exponent. The calculated maximum likelihood position is expressed as $(X_M, Y_M)$. Since, in the small angle limit, all of the angular error values $\psi_i$ are linear with $(X, Y)$, as shown in Equation 2, there exists an analytical solution to this problem. The maximum likelihood coordinates of the mobile phone can be expressed as:

$$X_M = \left\{ \sum_{i=1}^{N} \frac{\cos^2\theta_i}{D_i^2 \sigma_i^2} \left( \sum_{i=1}^{N} \frac{\sin^2\theta_i X_i}{D_i^2 \sigma_i^2} - \sum_{i=1}^{N} \frac{\sin\theta_i \cos\theta_i Y_i}{D_i^2 \sigma_i^2} \right) + \right.$$

$$\left( \sum_{i=1}^{N} \frac{\sin\theta_i \cos\theta_i}{D_i^2 \sigma_i^2} \right) \left( \sum_{i=1}^{N} \frac{\cos^2\theta_i Y_i}{D_i^2 \sigma_i^2} - \right.$$

$$\left. \sum_{i=1}^{N} \frac{\sin\theta_i \cos\theta_i X_i}{D_i^2 \sigma_i^2} \right) \right\} / \left[ \sum_{i=1}^{N} \frac{\sin^2\theta_i}{D_i^2 \sigma_i^2} \sum_{i=1}^{N} \frac{\cos^2\theta_i}{D_i^2 \sigma_i^2} \right.$$

$$\left. - \left( \sum_{i=1}^{N} \frac{\sin\theta_i \cos\theta_i}{D_i^2 \sigma_i^2} \right)^2 \right]. \quad \text{(Equation 3)}$$

$$Y_M = \left\{ \sum_{i=1}^{N} \frac{\sin^2\theta_i}{D_i^2 \sigma_i^2} \left( \sum_{i=1}^{N} \frac{\cos^2\theta_i Y_i}{D_i^2 \sigma_i^2} - \sum_{i=1}^{N} \frac{\sin\theta_i \cos\theta_i X_i}{D_i^2 \sigma_i^2} \right) + \right.$$

$$\left( \sum_{i=1}^{N} \frac{\sin\theta_i \cos\theta_i}{D_i^2 \sigma_i^2} \right) \left( \sum_{i=1}^{N} \frac{\sin^2\theta_i X_i}{D_i^2 \sigma_i^2} - \right.$$

$$\left. \sum_{i=1}^{N} \frac{\sin\theta_i \cos\theta_i Y_i}{D_i^2 \sigma_i^2} \right) \right\} / \left[ \sum_{i=1}^{N} \frac{\sin^2\theta_i}{D_i^2 \sigma_i^2} \sum_{i=1}^{N} \frac{\cos^2\theta_i}{D_i^2 \sigma_i^2} \right.$$

$$\left. - \left( \sum_{i=1}^{N} \frac{\sin\theta_i \cos\theta_i}{D_i^2 \sigma_i^2} \right)^2 \right]. \quad \text{(Equation 4)}$$

The spread of standard deviation of the angular error, $\sigma_i$ is the critical parameter in the model. These values actually characterize the inclusion of all the uncertainties in the environment and in the system. It is worth while to notice that when all $\sigma_i$ are equal, they will completely drop out of the above equations automatically. All the $D_i$ will also disappear from the equations when they are equal.

Using the maximum likelihood calculation described above, a good position approximation is determined for normal situations defined as those where LOS signals are measured at all the base stations and where error in angular measurement follows a normal distribution. In practice, however, the received signals may not all be LOS signals. This is particularly true in urban areas where many large buildings block the line of sight from a transmitter to a base station. If an NLOS measurement is included as an input to the maximum likelihood location estimation, a substantial error may arise in the position determination.

In order to improve the maximum likelihood calculation discussed above, the next step in the process is to calculate the error in the angular measurement at each base station (step 320). The following equation is exemplary of equations useful for calculating the error of angular measurement at the i-th base station.

$$\psi_i = \frac{|(X_M - X_i)\sin\theta_i - (Y_M - Y_i)\cos\theta_i|}{\sqrt{(X_M - X_i)^2 + (Y_M - Y_i)^2}} \quad \text{(Equation 5)}$$

A list including the error of angle measurement for each bases station is then created. The list of values $\psi_i$ are then sorted in accordance with their absolute value $|\psi_i|$. The root means square of the list of $\psi_i$ values, RMS ($\psi$) is then calculated.

In the next step, those error of angular measurements whose absolute value exceeds a threshold valued are selected (step 330). The selected value should be chosen to be much greater than RMS ($\psi$). An example of a threshold value is 1.5 times RMS ($\psi$).

Next, a new maximum likelihood position is calculated using equations 3 and 4 and the values of those base stations whose error of angular measurement values were not selected in the previous step (step 340). An improved position estimation is thereby calculated.

In an alternate embodiment, the above procedure of culling out those base stations whose error values exceed a certain threshold value (steps 330 and 340) may be repeated by lowering the threshold to select more base stations. The removal of base stations will automatically stop when there are no more base stations whose angular measurement error is much larger than normal, i.e., the process has a value beyond which it will not lower the threshold value, for example 1.2 times RMS ($\psi$). Once the threshold reaches that value, no more iterations are performed.

An example of the operation of the above described process will now be presented. We will look at situations that involve a varying number of N base stations. In the case of N base station involvement, they are assumed to be located along a circle of a radius of 5 km. The angular separation of the close-by base stations is $2\pi/N$ for N>2. In the case of N=2, the angular separation of the two base stations is chosen to be $\pi/2$, the configuration that works most efficiently for a two-station system. The transmitter is assumed to be located at the center of the circle.

The LOS signals are assumed to follow a Gaussian distribution in the angular response, with its mean corresponding to the exact angle from the location of the base station to the mobile. The standard deviation of the Gaussian distribution is chosen to be $\sigma=1°$, $5°$, $10°$ respectively. For the NLOS signals, the AOA is assumed to be a value uni-randomly distributed between $(-\pi, \pi)$.

Each experiment of the position estimation is considered to be with one configuration of the AOA so generated. From many such experiments, or runs, statistical data may be collected for the accuracy of the position estimation. Consider the distance from the true position to the estimated position to be R, the root mean square of R is our performance criterion of position estimation. It characterizes the typical size of a circle that the mobile phone may lie in.

Figure 4:
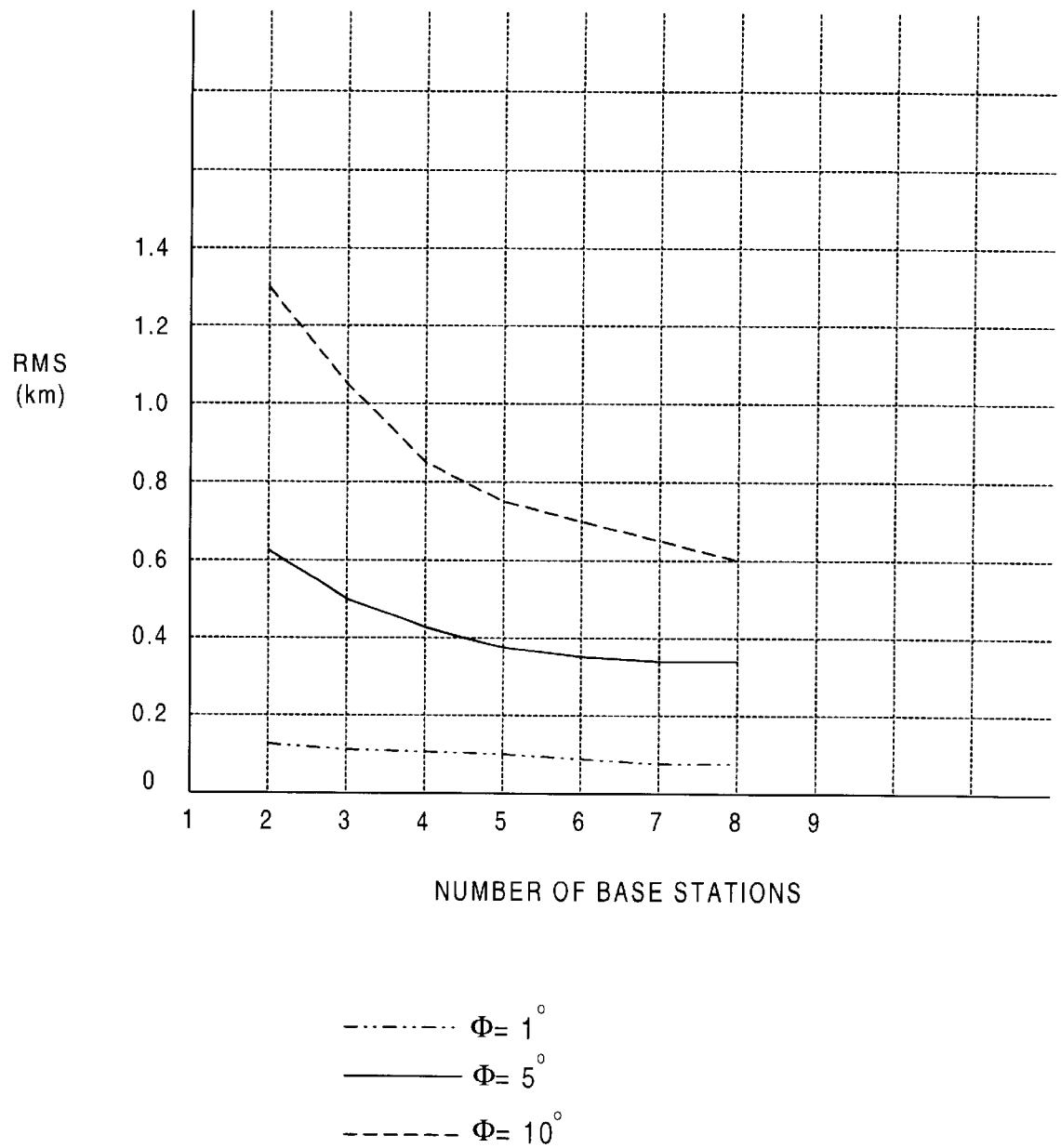
FIG. 4 is a graph of the relationship between the root mean square of the position estimation and the number of base stations for three values angular spread of the AOA measurement.

In FIG. 4 we show the performance of AOA location technique with the number of base stations running from 2 to 8. Three curves are presented for the angular spread $1°, 5°, 10°$ degrees. With an increasing number of base stations, the accuracy of the position estimation improves consistently, especially when large angular errors are present at the base stations. Although the accuracy in the positioning would eventually saturate with enough base stations, the practice of involving more than 2, the minimum number required, improves the accuracy greatly.

Figure 5:
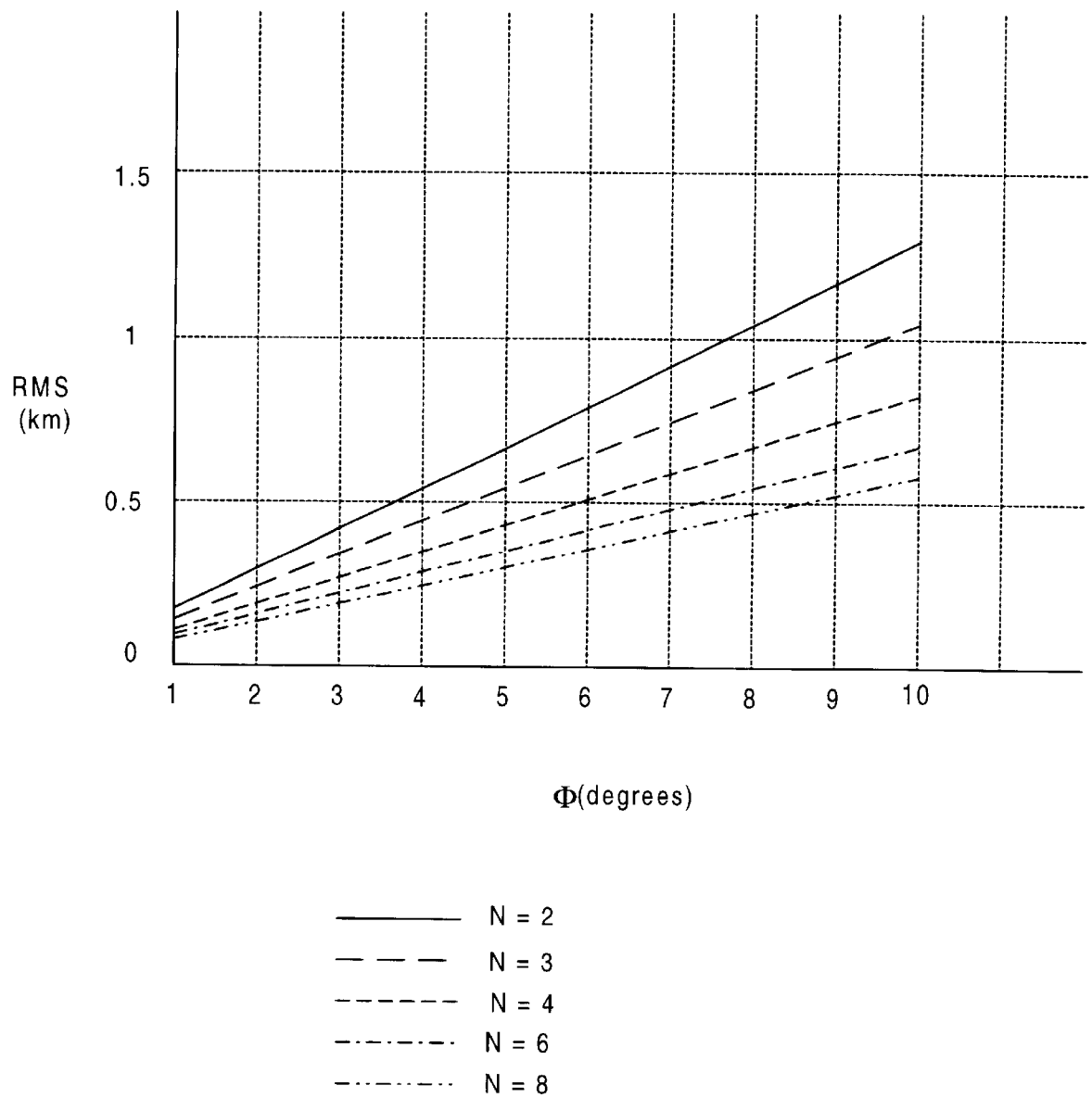
FIG. 5 is a graph of the relationship between the root mean square of the position estimation and angular spread of the AOA measurement for five number of base stations.

In FIG. 5 we show the accuracy of the location estimation as a function of angular spread of the base station measurement. The dependence of the two quantities is almost linear. This should be the case in the small angle limit, wherein the chord subtended by an angle is proportional to the angle.

Another interesting observation of the figure is that the performance of a large-N system is less susceptible to the angular measuring error at the base stations.

Figure 6:
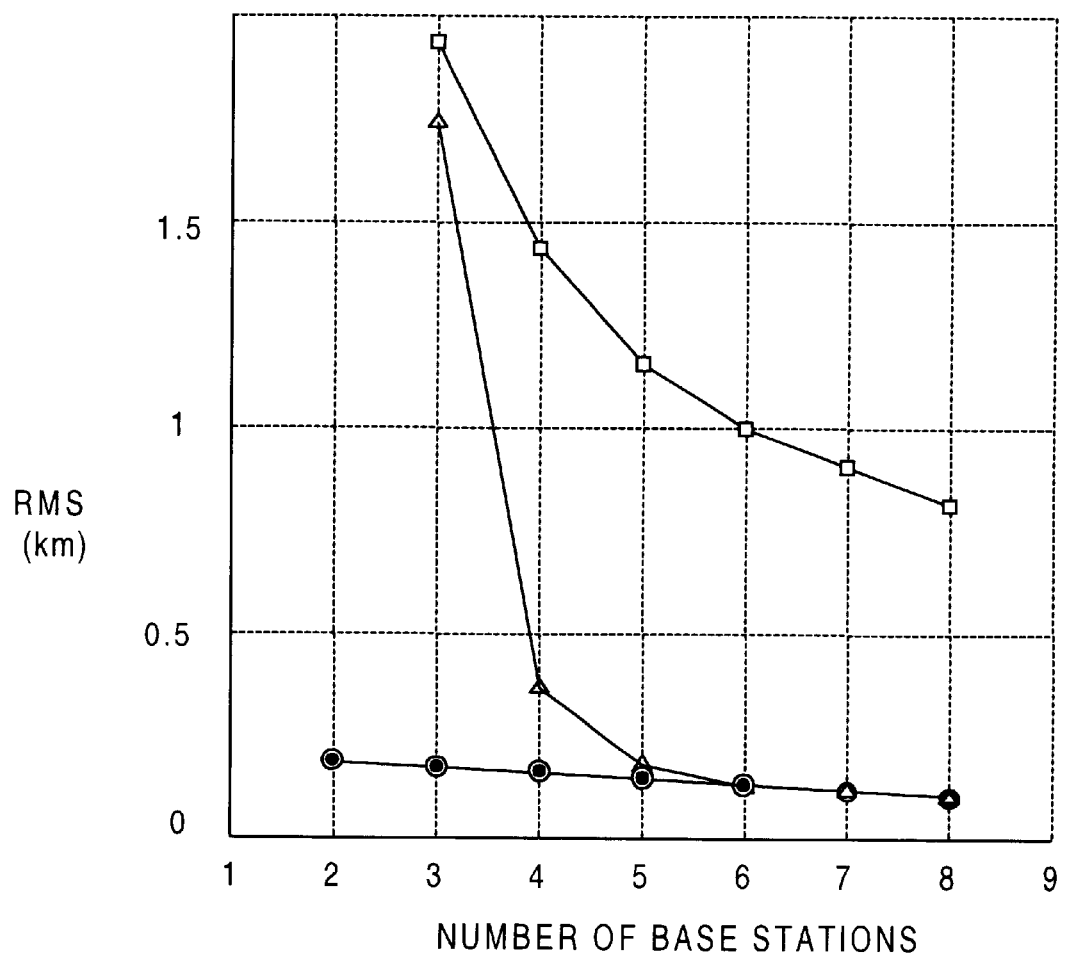
FIG. 6 is a graph showing the performance of the selective method of the present invention.

In FIG. 6 we show the effect of NLOS in position accuracy and the efficiency of the selective model. The curves with squares or large circles as reference marks include all of the base stations in the calculation. The curves with triangles or small circles as reference marks are results obtained with the proposed selective model. For the curves called NLOS curves, only one out of the N base stations is assumed to have the NLOS signal. The other N–1 ase stations have received normal signals whose angular error has $1°$ in s.t.d. One can see that even only one NLOS is damaging enough to the accuracy. But with the selective model, one can very efficiently diagnose and reduce the errors raised by the NLOS signal. It works particularly well when base stations are in surplus. Also in FIG. 6 we have superimposed for comparison a results set where all N signals are LOS signals.

One can see that using the selective model designed for mitigating the NLOS signals will not introduce extra error when NLOS is not present. Also in the large N limit, the error due to NLOS can be eliminated almost completely.

It will be apparent to those skilled in the art that various modifications and variations can be made in the calculations of the present invention and in the selection of signals to discard without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of estimating the position of a transmitter using a direction estimation from each of a plurality of receivers comprising:

a) calculating a first position estimation using each of the direction estimations;

b) calculating an error in the direction estimation for each receiver;

c) selecting those receivers whose measurement error is below a first threshold;

d) calculating a second position estimation using the direction estimations of the selected receivers; and e) recursively performing steps c) and d) with lower first threshold values until all of the selected receivers have measurement errors below a second threshold.

2. The method of claim 1, wherein the direction estimations are angle-of-arrival direction estimations.

* * * * *